Figures 1, 2:
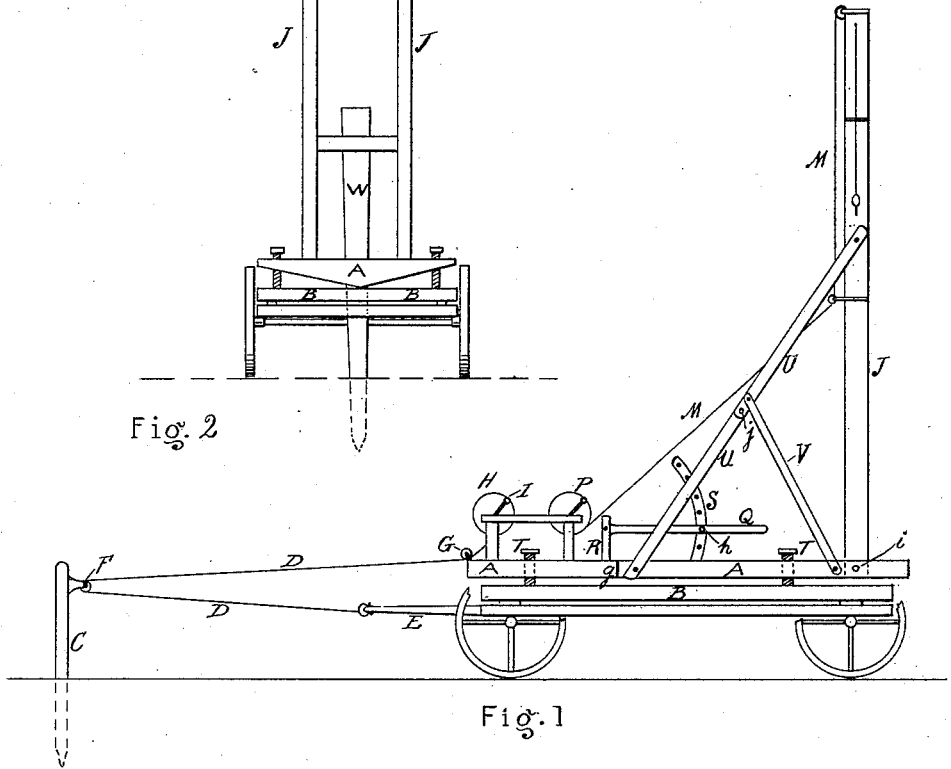

(No Model.)

J. C. DOBIE.
PORTABLE POST DRIVING MACHINE.

No. 358,023. Patented Feb. 22, 1887.

WITNESSES
N. Beech
Wm Webb

INVENTOR
John C. Dobie
per atty
Henry Beech

UNITED STATES PATENT OFFICE.

JOHN C. DOBIE, OF MORA, COUNTY OF MIDDLESEX, ONTARIO, CANADA.

PORTABLE POST-DRIVING MACHINE.

SPECIFICATION forming part of Letters Patent No. 358,023, dated February 22, 1887.

Application filed June 14, 1884. Serial No. 134,866. (No model.) Patented in Canada March 27, 1884, No. 19,972.

*To all whom it may concern:*

Be it known that I, JOHN C. DOBIE, of the township of Mora, in the county of Middlesex and Province of Ontario, Canada, a subject of the Queen of Great Britain, have invented certain new and useful Improvements in Portable Post-Driving Machines, of which the following specification is a full, clear, and exact description, which will enable others skilled in the art to which it appertains to make and use the same.

Figure 1 is an elevation at side. Fig. 2 is an elevation at front.

My invention relates to portable post-driving machines; and it consists of improvements in the tripping mechanism of such machines.

A is the frame of the machine, resting on truck B.

C is an anchor-post driven into the earth in front.

D is a rope or chain attached to tongue E, and thence passing round block F, attached to anchor-post. This rope or chain is carried back to a pulley, G, and up to windlass H on front of machine, round which it is wound.

I is a crank by which the windlass is operated, thereby drawing upon the rope or chain D and pulling the machine on its truck forward until the anchor-post is reached, when the latter will be taken out and reinserted in the ground, farther ahead.

J J are a pair of standards erected from the frame A. K is the driving-block working between these standards, the sides of said driving-block being grooved to receive the standards.

L is the clutch, which alternately raises and releases this tripping-block. It consists of two curved arms pivoted at $a$, the lower ends, $b\ b$, biting upon the head $c$ of driving-block.

M is a rope or chain passing over pulley N on cross-top of standards J, and thence connected to the short ropes or chains $d$, each of which is attached to one of the upper ends of the curved arms of clutch.

O is a wedge-shaped trip-block filling the space between the standards J at top or any intermediate point. The ropes or chains $d$, attached to ends of clutch L, pass through channels bored on each side of trip-block O. When they are drawn upon, the clutch grasps the head of the trip-block and raises it until the upper curved arms of said clutch strike against wedge-shaped block O, when they are forced open and the bottom portion is consequently opened, releasing the head of tripping-block and allowing it to descend upon the post W, which is to be driven into the ground.

The rope or chain M, attached at one end by the two short ropes or chains $d$ to curved arms of clutch, as already described, and passing over pulley N, is then brought down and wound round a small windlass, P, erected on the forepart of the frame, A, and is operated by means of this windlass being alternately slacked out and drawn in.

$e\ e$ are pins passing through holes in arms projecting on each side from top of wedge-shaped tripping-block O, and received in any pair of two series of holes, $f\ f$, bored for that purpose in the standards J J, and by this arrangement the tripping-block may be adjusted at any height between the standards, so as to regulate the force of the blow of the driving-block K by tripping it at any height.

The frame A is made in separate sections, jointed at each side at $g$. This is to allow of the rear portion being tilted when the ground is unequal, so that the standards J may retain their upright position. This tilting is effected by means of a lever, Q, rigidly secured to short upright R on forward section of frame, and S is an arc on rear section, having a series of holes formed in it, and $h$ is a pin passing through the lever opposite the arc, and received in one or other of the holes, in order to hold the lever at any height. The rear portion is lifted to the required angle and the lever set to the required point, when the pin retains it in place and with it the rear portion of frame, the lever, arc, and pin being of sufficient strength of construction.

T T are screws at each side of machine. The lower parts of these screws are received in sockets on top of truck B and the upper parts are received in threaded sockets in frame A, at each side, and terminate in square or crutch-shaped heads by which they may be turned in their threaded sockets, so as to raise or lower either side of the frame in order to suit unevenness of the ground.

The standards J are pivoted at bottom to the sides of frame A by bolts *i*, which pass through the feet of standards and through sides of frame, so as to allow of the standards being thrown forward, and thus lowered in passing along the road. The side braces, U, are each made in two parts, joined by pin or bolt *j* near the center, and further strengthened by extra brace V at each side, this brace being pivoted at one end to one of the sections of brace U, and at the other end to frame A, and by this arrangement, when the standards J are lowered, the braces fold together beneath, so as to occupy the least amount of space.

No claim is made in this specification to any of the ordinary parts or attachments of post-driving machines, nor to any of the parts above described, further than those embraced in the following claims.

Having thus described my invention, what I claim as new is—

1. In a portable post-driving machine, the adjustable tripping-block O, shaped substantially as shown and attached to standards J J by pins *e*, passing through extension-arms of tripping-block and received in suitable holes, *f*, in said standards, so as to regulate the height of trip, substantially as shown and specified.

2. In combination with the above-described tripping-block O and the driving-block or hammer K, the clutch L, shaped substantially as shown and described and operated by ropes or chains M *d* and windlass P, substantially as shown and specified, and for the purpose set forth.

JOHN C. DOBIE.

Witnesses:
HENRY BEECH,
RICHARD HAYLY.